(12) United States Patent
Hotta et al.

(10) Patent No.: US 7,672,202 B2
(45) Date of Patent: Mar. 2, 2010

(54) OPTICAL PICKUP APPARATUS

(75) Inventors: Tohru Hotta, Gunma (JP); Yoshio Hayashi, Gunma (JP); Noriyoshi Ooyama, Gunma (JP); Kiyotaka Eizumi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 510 days.

(21) Appl. No.: 11/560,758

(22) Filed: Nov. 16, 2006

(65) Prior Publication Data

US 2007/0127349 A1 Jun. 7, 2007

(30) Foreign Application Priority Data

Nov. 21, 2005 (JP) .............................. 2005-335565
Nov. 9, 2006 (JP) .............................. 2006-303906

(51) Int. Cl.
*G11B 7/00* (2006.01)

(52) U.S. Cl. .............................. 369/44.41; 369/112.07; 369/112.17

(58) Field of Classification Search .............. 369/44.23, 369/44.24, 112.17, 112.03, 112.07, 110.03, 369/44.41, 44.42, 112.01, 112.02, 112.1

See application file for complete search history.

(56) References Cited

U.S. PATENT DOCUMENTS 5,923,626 A * 7/1999 Richter ..................... 369/44.23

6,822,771 B2 * 11/2004 Funato et al. ................. 359/15

FOREIGN PATENT DOCUMENTS

JP 2003-162831 6/2003

* cited by examiner

*Primary Examiner*—Nabil Z Hindi
(74) *Attorney, Agent, or Firm*—Fish & Richardson P.C.

(57) ABSTRACT

An optical pickup apparatus comprising: a diffraction grating including a first grating for diffracting a first laser light beam, and a second grating for diffracting a second laser light beam which is shorter in wavelength than the first laser light beam, the diffraction grating being disposed in a common optical path for guiding the first laser light beam and the second laser light beam to an optical disc; and a photo detector including in a first light receiving area, a main light receiving unit, a front sub-light receiving unit, and a rear sub-light receiving unit that receive reflected light beams, which are reflected by the optical disc, of a main beam, of a front sub-beam, and of a rear sub-beam, respectively, the first laser light beam being diffracted by the diffraction grating into the main beam, the front sub-beam formed in front of the main beam, and the rear sub-beam formed at the back of the main beam, wherein the first grating is set such that the front sub-light receiving unit and the rear sub-light receiving unit in the first light receiving area are disposed at positions which substantially avoid unnecessary diffracted light beam spots which are generated by projecting to the first light receiving area unnecessary diffracted light beams, the unnecessary diffracted light beams generated by the second grating from the first laser light beam.

7 Claims, 6 Drawing Sheets

OPTICAL PICKUP APPARATUS

CROSS-REFERENCE TO RELATED APPLICATION

This application claims the benefit of priority to Japanese Patent Applications Nos. 2005-335565 and 2006-303906, filed Nov. 21, 2005 and Nov. 9, 2006 respectively, of which full contents are incorporated herein by reference.

BACKGROUND OF THE INVENTION

1. Field of the Invention

The present invention relates generally to an optical pickup apparatus that diffracts each of a first laser light beam and a second laser light beam which are different in wavelength by a diffraction grating disposed in a common optical path in an outward path which guides the first laser light beam and the second laser light beam, and that applies the diffracted light beams to an optical disc. The present invention relates more particularly to an optical pickup apparatus having a first grating that has diffracting action on the first laser light beam and a second grating that has diffracting action on the second laser light beam, both the gratings being formed as the diffraction grating.

2. Description of the Related Art

In an optical pickup apparatus that optically records and reproduces a signal to/from an optical disc such as a CD (Compact Disc) or a DVD (Digital Versatile Disc) with use of a laser light beam, an astigmatism method or a differential astigmatism method which is an application thereof are mainly employed as focusing control for causing the laser light beam applied to the disc to focus on signal layer of the disc.

On the other hand, as tracking control for causing the laser light beam applied to the disc to trace a signal track of the disc, is employed mainly any one of a 3-beam method, a push-pull method, a phase difference method, and an application thereof, in accordance with the standard and the scheme of the disc.

A practical example of an optical pickup apparatus supporting various types of CD for recording and reproducing, a DVD-ROM, and a DVD±R/RW employs, e.g., the astigmatism method for various types of CD for recording and reproducing, as the focus controlling scheme. Another practical example of the optical pickup apparatus employs, e.g., the differential astigmatism method that is an application of the astigmatism method for various types of DVD for recording and reproducing, as the focus controlling scheme. On the other hand, a practical example of the optical pickup apparatus employs, e.g., the phase difference method for a DVD-ROM and the differential push-pull method that is an application of the push-pull method for a DVD±R/RW and a CD, as the tracking controlling scheme.

When the basic form or an application form of the astigmatism method is employed for the focusing control, there is provided an astigmatism-generating optical system such as an anamorphic lens for generating astigmatism in a reflected laser light beam from the disc or a parallel plate disposed being inclined to the optical axis, and there is used a photo detector having a light receiving area that is divided into four by two dividing lines which are perpendicular to each other and each of which forms an angle of 45 degree relative to the direction of the generation of the astigmatism.

On the other hand, the differential astigmatism method for the focusing controlling scheme, and the differential push-pull method or the 3-beam method for the tracking controlling scheme, each needs three beams as the laser light beam to be applied to the disc. For this reason, in an optical pickup apparatus employing one of these methods, as already known, there is provided a diffraction grating for diffracting a laser light beam emitted form a semiconductor laser to be divided into three beams that are a 0th-order light beam and ±1st-order diffracted light beams, and there is used a photo detector having three light receiving units for respectively receiving three reflected laser light beams, that are the above three beams reflected by the disc.

In the optical pickup apparatus, incidentally, an optical path thereof is simplified, with use of a multi-laser unit that emits at least two different types of laser light beam: a laser light beam having a wavelength suitable for the recording density of a CD; and a laser light beam having a wavelength suitable for the recording density of a DVD. The multi-laser unit has a plurality of laser emitting points at which a plurality of laser light beams different in wavelength are respectively emitted by a single laser chip or by a plurality of laser chips, each of which is formed separately, and which are disposed together on a single semiconductor base.

In an optical pickup apparatus using such a multi-laser unit as above, in order to form the three beams, there is disposed a two-wavelength supporting diffraction grating provided with separate gratings so as to support different wavelengths of the first laser light beam and the second laser light beam respectively, wherein the two laser light beams are emitted by a two-wavelength supporting multi-laser, and wherein the separate gratings are formed on the outward path that guides the laser light beams to the optical disc. Because of forming different gratings respectively for the first laser light beam and the second laser light beam, the two-wavelength supporting diffraction grating is advantageous for optical design in terms of the diffraction efficiency, the diffraction angle, etc. Therefore, when the multi-laser unit is used, it is preferable to use a diffraction grating that supports a plurality of wavelengths and that is designed optimally for each of all wavelengths emitted from the multi-laser unit.

Such a conventional optical pickup apparatus is disclosed in, e.g., Japanese Patent Application Laid-Open Publication No. 2003-162831.

However, when the above diffraction grating that supports a plurality of wavelengths is used, both of the first laser light beam and the second laser light beam emitted from the multi-laser unit pass through both of the gratings of the diffraction grating. Therefore, unnecessary diffracted light beams are generated at the passing the diffraction grating. Consequently, an unnecessary diffracted light beam spot of the unnecessary diffracted light beam is projected onto the light receiving area of the photo detector, and this becomes a factor that disturbs light receiving outputs obtained respectively from sub-light receiving units corresponding to a front sub-beam and a rear sub-beam (generally, ±1st-order diffracted light beams) in the light receiving area, wherein the front sub-beam and the rear sub-beam are positioned respectively in front of and at the back of the main beam of the three beams.

With respect to an optical pickup apparatus supporting CDs and DVDs, in the case that a multi-laser unit thereof can emit a laser light beam with an infrared wavelength band of 765 nm to 805 nm which is suitable for CDs, and can also emit another laser beam with a red wavelength band of 645 nm to 675 nm which is suitable for DVDs, the use of a two-wavelength supporting diffraction grating for CDs and DVDs results in a projection of the unnecessary diffracted light beam spot onto a position on the main light receiving unit side in each of the sub-light receiving units of a light receiving are a for CDs, due to the passage of the laser light beam for CDs through the DVD-supporting grating of the diffraction grating. Thereby, an effect of disturbing the light receiving output obtained from each of the sub-light receiving units is significant. In particular, there are formed light receiving areas corresponding respectively to laser light beams emitted from the multi-laser unit in the photo detector. Therefore, when a multi-laser unit is used, a position of each of the light receiving units of each of the light receiving areas is limited corresponding to a position of each of laser emitting points of the multi-laser unit, and the effect of the unnecessary diffracted light beam spot exerted on the light receiving output is significant, wherein the light receiving output is obtained from each of the sub-light receiving units of each of the light receiving areas.

SUMMARY OF THE INVENTION

According to the major aspect of the present invention to solve the above problems, an optical pickup apparatus comprising: a diffraction grating including a first grating for diffracting a first laser light beam, and a second grating for diffracting a second laser light beam which is shorter in wavelength than the first laser light beam, the diffraction grating being disposed in a common optical path for guiding the first laser light beam and the second laser light beam to an optical disc; and a photo detector including in first light receiving area, a main light receiving unit, a front sub-light receiving unit, and a rear sub-light receiving unit that receive reflected light beams, which are reflected by the optical disc, of a main beam, of a front sub-beam, and of a rear sub-beam, respectively, the first laser light beam being diffracted by the diffraction grating into the main beam, the front sub-beam formed in front of the main beam, and the rear sub-beam formed at the back of the main beam, wherein the first grating is set such that the front sub-light receiving unit and the rear sub-light receiving unit in the first light receiving area are disposed at positions which substantially avoid unnecessary diffracted light beam spot which are generated by projecting to the first light receiving area unnecessary diffracted light beams, the unnecessary diffracted light beams being generated by the second grating from the first laser light beam. Thereby, the unnecessary diffracted light beam spots are projected outside the front sub-light receiving unit and the rear sub-light receiving unit of the first light receiving area.

According to the optical pickup apparatus of the present invention, the front sub-light receiving unit and the rear sub-light receiving unit of the first light receiving area are disposed at positions that substantially avoid the unnecessary diffracted light beam spots which are generated by projecting to the first light receiving area the unnecessary diffracted light beams, wherein the unnecessary diffracted light beams are generated when the first laser light beam passes through the second grating which is suited to the second laser light beam which is different in wavelength from the first laser light beam. Therefore, the unnecessary diffracted light beam spots are projected outside the front sub-light receiving unit and the rear sub-light receiving unit and, thereby, the light receiving outputs obtained from the front and the rear sub-light receiving units can be prevented from being disturbed by the unnecessary diffracted light beam spots.

In this case, it has been confirmed that an effect is significant that is exerted by the unnecessary diffracted light beam spots attributed to unnecessary diffracted light beams of the laser light beam on the longer wavelength side diffracted by the grating of the diffraction grating, which suits the laser light beam on the shorter wavelength side, in the light receiving area supporting the laser light beam on the longer wavelength side which suits an optical disc having a wide pitch of a signal track thereof. Therefore, when a countermeasure is taken against an adverse effect on the unnecessary diffracted light beam spots only for the laser light beam having one of the wavelengths, it is more efficient to take a countermeasure against the laser light beam on the longer wavelength side. It is more preferable in terms of the performance to take a countermeasure against an adverse effect on the unnecessary diffracted light beam spots for the respective laser light beams, each of which is different in wavelength.

For a photo detector having light receiving areas that respectively support laser light beams, each of which is different in wavelength, the degree of freedom is small for the position at which the photo detector is to be disposed and for the positions at which the laser receiving areas are to be disposed. Therefore, the advise affect on the unnecessary diffracted light beam spots tends to be larger. However, according to the optical pickup apparatus of the present invention, even when a single photo detector is employed, the light receiving outputs of the sub-light receiving units of the photo detector can be prevented from being disturbed by the unnecessary diffracted light beam spots.

By setting the area of each light receiving unit in the light receiving area supporting the laser light beam on the longer wavelength side to be smaller than that of each light receiving unit in the light receiving area supporting the laser light beam on the shorter wavelength side, an effect is exerted to reduce the effect of the unnecessary diffracted light beam spots on each of the light receiving outputs obtained from each of the sub-light receiving units in the light receiving area that supports the laser light beam on the longer wavelength side.

The first grating for generating diffracting action affectively on the first laser light beam and the second grating for generating diffracting action effectively on the second laser light beam are configured to be integrated in the diffraction grating, which is advantageous for installation of the diffraction grating.

By configuring at least one of the first grating and the second grating to be a phase shifting grating that generates a phase shift causing in part an inverted phase in each of the front sub-beam and the rear sub-beam and the diffracts the beams to be applied to an identical signal track of the optical disc, the intervals in the arrangement and the angles of the arrangement to the signal track, of the main beam, the front sub-beam, and the rear sub-beam in at least one of the laser light beams do not need to be considered. Therefore, the degree of freedom is high in setting the intervals between the main beam, the front sub-beam, and the rear sub-beam of each of the first laser light beam and the second laser light beam, and an advantage is obtained for setting positions for arrangement of the front sub-light receiving unit and the rear sub-light receiving unit of each of the first light receiving area and the second light receiving area.

The features of the present invention will become more apparent from the accompanying drawings and the description herein.

BRIEF DESCRIPTION OF THE DRAWINGS

For more thorough understanding of the present invention and the advantageous thereof, the following description should be referenced in conjunction with the accompanying drawings in which.

DETAILED DESCRIPTION OF THE INVENTION

Figure 1:
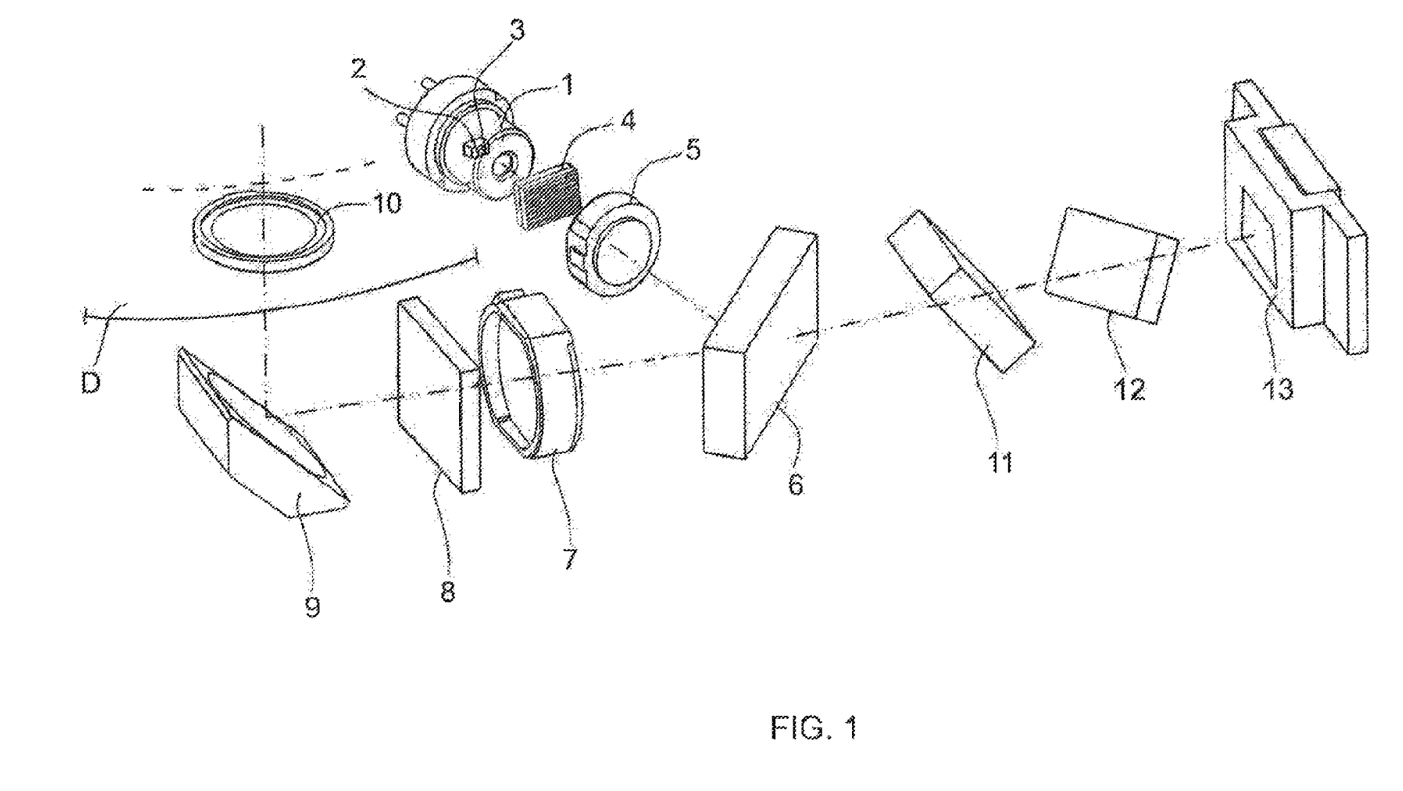
FIG. 1 shows the optical configuration of an embodiment of an optical pickup apparatus according to the present invention.

FIG. 1 shows the optical configuration of an embodiment of an optical pickup apparatus according to the present invention, and the optical pickup apparatus is configured to support CDs and DVDs.

A laser unit 1 is configured with a laser diode having: a first light emitting point 2 that emits a first laser light beam with a first wavelength, e.g., 782 nm, in an infrared wavelength band of 765 nm to 805 nm that is suitable for CDs; and a second light emitting point 3 that emits a second laser light beam with a second wavelength, e.g., 655 nm, in a red wavelength band of 645 nm to 675 nm that is suitable for DVDs, both the light emitting points being on an identical semiconductor substrate. The laser unit 1 is a so-called multi-laser unit that emits a laser light beam having two wavelengths that are suitable for recording and reproducing of CDs as well as for recording and reproducing of DVDs, respectively.

A first laser light beam and a second laser light beam emitted respectively from the first light emitting point 2 and the second light emitting point 3 of the laser unit 1 are diffracted by a 3-beam separating diffraction grating 4 supporting two wavelengths so as to form ±1st-order diffracted light beams to be used for tracking control in the differential push-pull method and for focusing control in the differential astigmatism method, thereafter, are adjusted by coupling lens 5 in terms of the angles of diversion thereof, and are reflected by a polarizing filter plane of a plate-type polarizing beam splitter 6.

The laser light beams reflected by the polarizing beam splitter 6 are adjusted by a collimator lens 7 into parallel light beams; thereafter, pass through a ¼-wavelength plate 8 to be converted into circularly polarized light beams; are deflected by a reflecting mirror 9 in terms of the optical axes thereof to be incident upon an objective lens 10; and are converged by the objective lens 10 to be applied to a disc D.

The objective lens 10 is designed such that a diffraction grating (not shown) for diffraction each laser light beam with a wavelength to be used for each type of optical disc depending on the optical properties of the laser light beam is formed on the incidence plane in an orbicular zone shape with the optical axis as the center thereof, and such that diffracted light beams of predetermined orders diffracted by the diffraction grating have light converging action appropriately, with the astigmatism thereof being corrected for the optical disc.

According to such an optical system, the first laser light beam for CDs and the second laser light beam for DVDs emitted respectively from the first light-emitting point 2 and the second light-emitting point 3 of the laser unit 1 are incident upon a single objective lens 10; are focused on a signal layer of the disc D by driving the objective lens 10 in focusing direction and in a tracking direction; and are applied to the signal layer of the disc D such that the beams are caused to trace a predetermined signal track.

The laser light beams modulated and reflected by the signal layer of the disc D return to the objective lens 10, and are returned through the optical path through which the beams have traveled, and reach the polarizing beam splitter 6. Because the laser light beams returned to the polarizing beam splitter 6 have passed through the ¼-wavelength plate 8 twice on the ways to/from the disc D, the laser light beams returned to the polarizing beam splitter 6 are rotated by ½ wavelength in terms of the polarization direction thereof. Therefore, the laser light beams having the S-polarization on the way to the disc D are incident upon the polarizing beam splitter 6 while having P-polarization.

Therefore, the laser light beams returned to the polarizing beam splitter 6 penetrate the polarizing filter plane; penetrate a first parallel plate 11 disposed slantwise to correct adverse astigmatism generated when the beams pass through the polarizing beam splitter 6; are provided with astigmatism that is a focused error component of each of the laser light beams applied to the disc D, by a second parallel plate 12; are corrected in terms of comatic aberration generated by the polarizing beam splitter 6 and the first parallel plate 11; and are guided to a photo detector 13.

Figure 2:
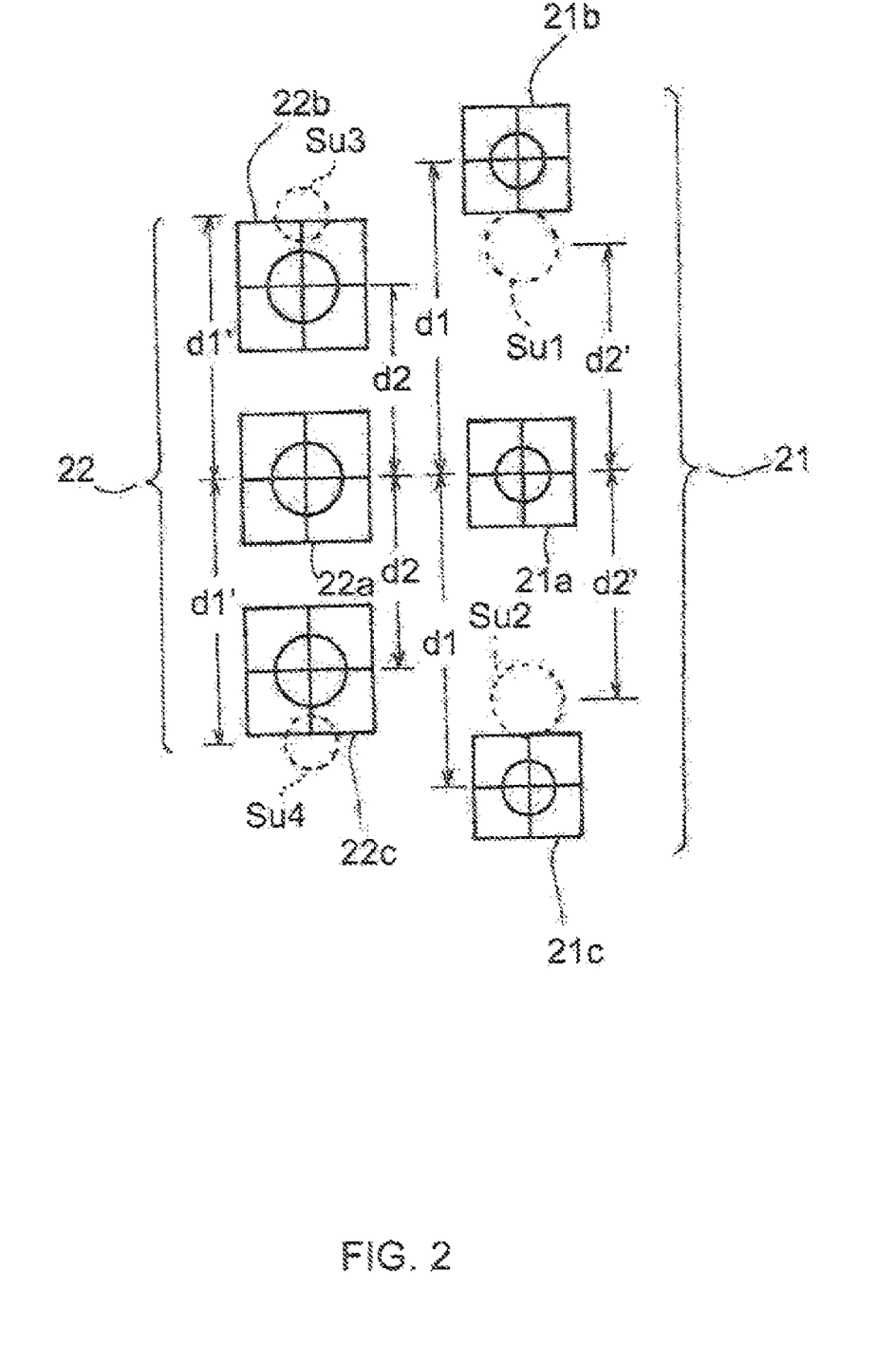
FIG. 2 is an explanatory view of an example of an arrangement of light receiving units of a light receiving area and an arrangement of light beam spots on the light receiving areas of a photo detector in the optical pickup apparatus according to the present invention.

As shown in FIG. 2, in the photo detector 13, a CD light receiving area 21 used for recording and reproducing of CDs and DVD light receiving area 22 used for recording and reproducing of DVDs are formed side by side on an identical light receiving plate. In the CD light receiving area 21, a main light receiving unit 21a as well as a front sub-light receiving unit 21b and a rear sub-light receiving unit 21c are formed respectively corresponding to the three beams of the first laser light beam for CDs, that is, the main beam which is the 0th-order light beam as well as the front sub-beam and the rear sub-beam which are ±1st-order light beams disposed in front of and at the back of the main beam for CDs. In the DVD light receiving area 22, a main light receiving unit 22a as well as a front sub-light receiving unit 22b and rear sub-light receiving unit 22c are formed respectively corresponding to the three beams of the second laser light beam for DVDs, that is, the main beam which is the 0th-order light beam as well as the front sub-beam and the rear sub-beam which are there ±1st-order light beams disposed in front of and at the back of the main beam for DVDs.

The interval between the light receiving units of the CD light receiving unit 21 correspond to the intervals of the light beam spots of the three beams on the signal plane of a CD, and the intervals between the light receiving units of the DVD light receiving unit 22 correspond to the intervals of the light beam spots of the three beams on the signal plane of a DVD.

The main light receiving unit 21a, the front sub-light receiving unit 21b, and the rear sub-light receiving unit 21c of the CD light receiving area 21, and the main light receiving unit 22a, the front sub-light receiving unit 22b, and the rear sub-light receiving unit 22c of the DVD light receiving area 22 in the photo detector 13, each is divided into four and each consists of four segments. The main light receiving unit 21a, the front sub-light receiving unit 21b, and the rear sub-light receiving unit 21c of the CD light receiving area 21 receive received light spots, each of which contains a focusing error component and a tracking error component that are effective to the directions of dividing lines of each of the light receiving units when the first laser light beam emitted from the laser unit 1 is applied to the optical disc. The main light receiving unit 22a, the front sub-light receiving unit 22b, and the rear sub-light receiving unit 22c of the DVD light receiving area 22 receive received light spots, each of which contains a focusing error component and a tracking error component that are effective to the directions of dividing lines of each of the light receiving units when the second laser light beam emitted from the laser unit 1 is applied to the optical disc.

Therefore, by calculating each received light output obtained in each segment constituting the main light receiving unit 21a, the front sub-light receiving unit 21b, and the rear sub-light receiving unit 21c of the CD light receiving area 21, on the basis of a predetermined formula for obtaining various types of signals, there can be obtained a main information signal, a focusing error signal, and a tracking error signal during the recording and the reproducing of a CD.

On the other hand, by calculating each received light output obtained in each segment constituting the main light receiving unit 22a, the front sub-light receiving unit 22b, and the rear sub-light receiving unit 22c of the DVD light receiving area 22, on the basis of a predetermined formula for obtaining various types of signal, there can be obtained a main information signal, a focusing error signal, and a tracking error signal, or a tilting error signal during the recording and the reproducing of a DVD.

Figure 3:
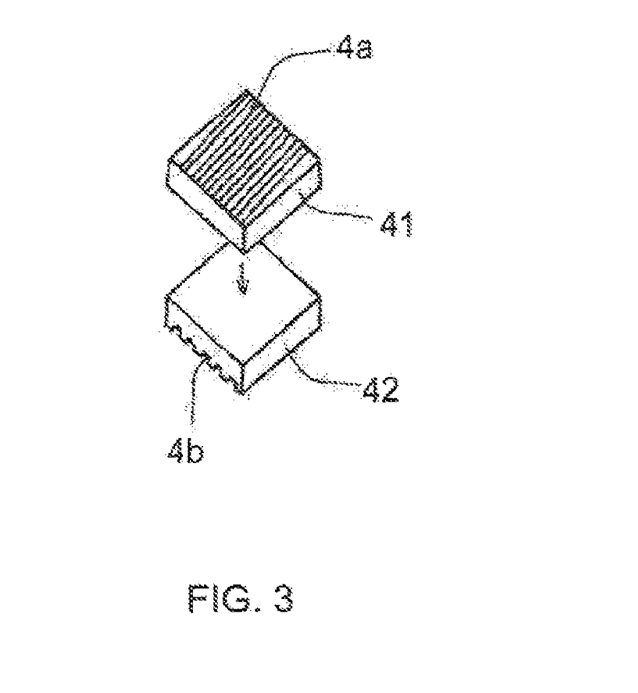
FIG. 3 is an explanatory view of an example of the configuration of a diffraction grating 4.

A shown in FIG. 3, the diffraction grating 4 is made in an integrated form, by bonding directly together: a first diffraction grating member 41 on which a first grating 4a having diffracting action on the first laser light beam emitted from the laser unit 1 is formed; and a second diffraction grating member 42 on which a second grating 4b having diffracting action on the second laser light beam is formed. In this case, for being integrated, the first and the second grating members 41 and 42 are bonded such that the faces on which the gratings are not formed are faces and such that the first grating 4a and the second grating 4b are on opposite sides. It is preferable to configure the diffraction grating 4 by forming directly the first grating 4a and the second grating 4b on the opposite sides of a base member respectively, wherein the base member is obtained by integrating the first diffraction grating member 41 and the second diffraction grating member 42 from the time of molding.

Figure 4:
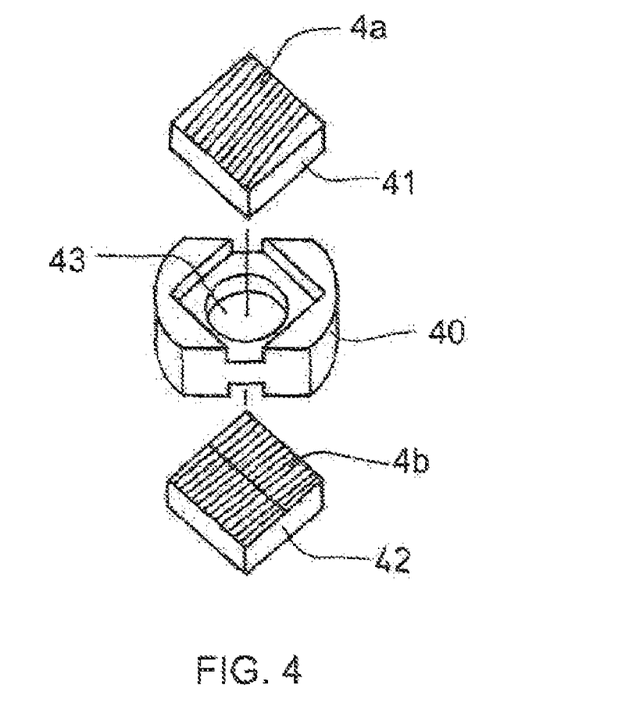
FIG. 4 is an explanatory view of an example of the configuration that is different from that of FIG. 3 of the diffraction grating 4.

Otherwise, as shown in FIG. 4, the diffraction grating 4 is made in an integrated form, by boding together the first diffraction grating member 41 and the second diffraction grating member 42 on both sides of a deformed cylinder-shaped holder 40 respectively, a hole 43 for the optical path being formed through the deformed cylinder-shaped holder 40. In this case, the first diffraction grating member 41 and the second diffraction grating member 42 do not contact directly each other and, therefore, the diffraction grating 4 may be designed such that the side on which the grating is formed in dispose on either side.

The second grating 4b is a phrase shifting grating that generates phrase shifts and diffracts the front sub-beam and the rear sub-beam so as to apply each area of light beam spots, which are inverse in phase to each other, of the front sub-beam and the rear sub-beam evenly to an identical signal track on the optical disc. On the other hand, the first grating 4a has an ordinary diffracting action by which no phase shift is generated in each sub-beam.

Figure 5:
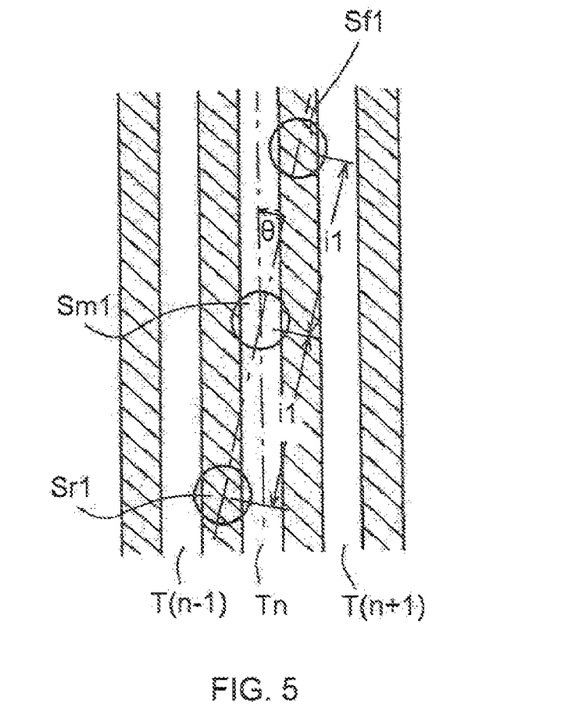
FIG. 5 is an explanatory view of an arrangement of light beam spots of a first laser light beam on an optical disc.

As shown in FIG. 5, a main spot Sm1, a front sub-spot Sf1 and a rear sub-spot Sr1 of the main beam, the front sub-beam, and the rear sub-beam, respectively, of the first laser light beam for CDs, which is diffracted by the first grating 4a of the diffraction grating 4 and is applied to the optical disc, are disposed on the optical disc at a predetermined angle θ against the signal track. In a state where the main spot Sm1 is positioned on track on a signal track Tn defined by the angle θ and the intervals between the spots i1, the front sub-spot Sf1 and the rear sub-spot Sr1 are disposed in the middle of the signal track Tn and a signal track T(n−1) on the inner side thereof and in the middle of the signal track Tn and a signal track T(n+1) on the outer side thereof, respectively.

Figure 6:
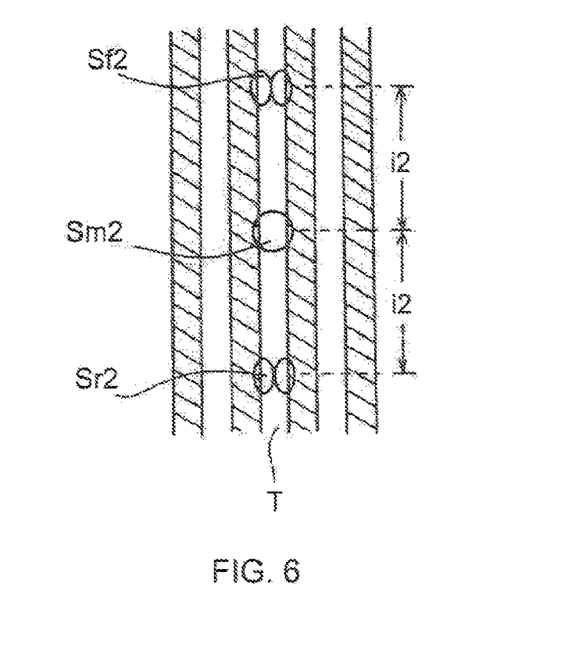
FIG. 6 is an explanatory view of an arrangement of light beam spots of a second laser light beam on the optical disc.

As shown in FIG. 6, a main spot Sm2, a front sub-spot Sf2, and a rear sub-spot Sr2 of a main beam Sm2, a front sub-beam Sf2, and a rear sub-beam Sr2, respectively, of the second laser light beam for DVDs, which is diffracted by the second grating 4b of the diffraction grating 4 and is applied to the optical disc, are disposed on the optical disc such that the spot Sm2, Sf2, and Sr2, are arranged in a line on the signal track. In a state where the main spot Sm2 is positioned on-track on a signal track T regardless of the intervals between the spots i2, the front sub-spot Sf2 and the rear sub-spot Sr2 are disposed such that each of the spots Sf2 and Sr2 is positioned on-track on the signal track T. The second grating 4b is configured to generate a phase shift to invert the phase, that is, to shift the phase of a laser light beam passing one of two areas by 180 degrees relative to the phase of a laser light beam passing the other of the two areas, wherein the two areas are obtained by dividing the second grating 4b into two in a tracking direction. Therefore, each of the front sub-spot Sf2 and the rear sub-spot Sr2 is projected as twin side inverse in phase to each other, which are positioned side by side in a direction perpendicular to the signal track, due to the phase shift area formed in the second grating 4b.

One of the dividing lines of each of the main light receiving unit 21a, the front sub-light receiving unit 21b, and the rear sub-light receiving unit 21c of the CD light receiving area 21 in the photo detector 13 is aligned with the direction of the signal track of a CD. Therefore, each push-pull signal can be obtained for each light receiving unit by calculating the difference of each total received light output of each area obtained by adding together each received light output from each segment in each half area dividing by the dividing line in each light receiving unit. The tracking error signal based on the differential push-pull method can be obtained by calculating a differential push-pull signal, with use of each push-pull signal.

On the other hand, one of the dividing lines of each of the main light receiving unit 22a the front sub-light receiving unit 22b, and the rear sub-light receiving unit 22c of the DVD light receiving area 22 in the photo detector 13 is aligned with the direction of the signal track of a DVD. Therefore, similarly to the CD light receiving area 21, each push-pull signal can be obtained for each light receiving unit by calculating the difference of each total received light output of each area obtained by adding together each received light output from each segment in each half area dividing by the dividing line in each light receiving unit. The tracking error signal based on the differential push-pull method can be obtained by calculating a differential push-pull signal, with use of each push-pull signal.

Both of the first laser light beam and the second laser light beam emitted from the laser unit 1 pass through the first grating 4a and the second grating 4b of the diffraction grating 4, and unnecessary diffracted light beams (usually, the ±1st-order diffracted light beams) which are not negligible are generated in a grating that does not support the laser light beam passing through the diffraction grating 4. Therefore, unnecessary diffracted light beam spots Su1 and Su2 are projected onto the light receiving areas of the photo detector.

The arrangement of the light receiving units of the CD light receiving area 21 and the light receiving units of the DVD light receiving area 22 are as in FIG. 2. The first grating 4a supporting CDs is set to diffract the first laser light beam such that the front sub-light receiving unit 21b and the rear sub-light receiving unit 21c of the CD light receiving area 21 are disposed respectively at positions at which an unnecessary diffracted light beam avoids the unnecessary diffracted light beam spots Su1 and Su2 projected onto the CD light receiving area 21, wherein the unnecessary diffracted light beam is generated, when the first laser light beam for a CD passes through the second grating 4b supporting DVDs.

In this case, the unnecessary diffracted light beam spots Su1 and Su2 of the ±1st-order diffracted light beams are projected at an interval, wherein the diffracted light beam spots are obtained by projecting a desired 0th-order diffracted light beam and ±1st-order diffracted light beams onto the DVD light receiving area 22, and wherein the beams are generated when the second laser light beam for DVDs passes through the second grating 4b supporting DVDs, and wherein the interval is an interval d2' which is substantially equal to a value obtained by multiplying: intervals d2 used for disposing the main light receiving unit 22a, the front sub-light receiving unit 22b, and the rear sub-light receiving unit 2c of the DVD light receiving area 22; by the ratio (782/655, about 1.19) of the wavelength 782 nm of the first laser light beam for CDs relative to the wavelength 655 nm of the second laser light beam for DVDs.

Therefore, the first grating 4a of the diffraction grating 4 is a set and the front sub-light receiving unit 21b and the rear sub-light receiving unit 21c are disposed such that the unnecessary diffracted light beam spots Su1 and Su2 are avoided. Each area of the front sub-light receiving unit 21b and the rear sub-light receiving unit 21c is set to be smaller than each area of the front sub-light receiving unit 22b and the rear sub-light receiving unit 22c of the DVD light receiving area 22. In view of the areas, are set the positions at which the front sub-light receiving unit 21b and the rear sub-light receiving unit 21c of the CD light receiving area 21 are disposed.

Note that, in the photo detector 13, with respect to the first laser light beam for CDs and the second laser light beam for DVDs, the effective diameter of the received light spot of the first layer light beam is smaller than the effective diameter of the received light spot of the second laser light beam in terms of a laser intensity of the same ratio, due to the difference in the effective aperture diameters between objective lenses, Therefore, it is reasonable to set each area of the light receiving units of the CD light receiving area 21 to be smaller than that of the light receiving units of the DVD light receiving area 22.

In the optical system of the optical pickup apparatus shown in FIG. 1, when the optical powers for the outward path and the return path are both set, e.g., to be six and each of intervals d2 between the main light receiving unit 22a, the front sub-light receiving unit 22b, and rear sub-light receiving unit 22c of the DVD light receiving area 22 is set to be 135 μm, the interval d2' of: the unnecessary diffracted light beam spots of the ±1st-order diffracted light beams; from the center of the main light receiving unit 21a of the CD light receiving area 21 is about 161 μm which is 135 μm×1.19 (=782/655), wherein the ±1st-order diffracted light beams are generated when the first laser light beam for a CD passes through the second grating 4b supporting DVDs.

Therefore, in order to avoid reception of the unnecessary diffracted light beam spots by the front sub-light receiving unit 21b and the rear sub-light receiving unit 21c of the CD light receiving area 21, the first grating 4a of the diffraction grating 4 is set, and the interval between: the main light receiving unit 22a; and the front sub-light receiving unit 22b and the rear sub-light receiving unit 22c, of the CD light receiving area 21 is set, and the size of each light receiving unit of the CD light receiving area 21 is set, in view of the radius of each of the unnecessary diffracted light beam spots for the interval d2' (about 161 μm) of: each of the unnecessary diffracted light beam spots; from the center of the main light receiving unit 21a.

The size of each of the main light receiving unit 22a, the front sub-light receiving unit 22b, and rear sub-light receiving unit 22c of the DVD light receiving area 22 is set to be, e.g., 90 μm×90 μm on the basis of the received light spot diameter received by each of the light receiving units. The receiving light spot diameter based on the first laser light beam received by the light receiving units of the CD light receiving area 21 can be assumed to be the ratio of the aperture diameter of a CD, e.g., 0.51 relative to the aperture diameter of a DVD, e.g., 0.66, that is 0.51/0.66, about 0.77 for the second laser light beam for DVDs. Therefore, when the size of each light receiving unit of the CD light receiving area 21 is 69 μm×69 μm obtained by multiplying the size 90 μm×90 μm of the light receiving units of the DVD light receiving area 22 by the ratio about 0.77 of the aperture diameter of a CD relative to the aperture diameter of a DVD, the ratio of the size of each light receiving unit relative to each light receiving spot diameter is substantially equal between the DVD light receiving area 22 and the CD light receiving area 21. When the size of each light receiving unit is reduced, disadvantages are arisen in terms on the light receiving sensitivity in each segment of each light receiving unit and countermeasures against the deformation of the received light spots due to the astigmatism for focus control. Therefore, the size of each light receiving unit of the CD light receiving area 21 is increased by 5% to 6% to, e.g., 73 μm×73 μM. However, it is advantageous to reduce the size of each light receiving unit of the CD light receiving area 21, with respect to the degree of influence to the unnecessary diffracted light beam spots. Therefore, the size of each light receiving unit of the CD light receiving area 21 is set trading for the above disadvantages and is preferably about ±10% or less of the ratio of the aperture diameter of a CD relative to the aperture diameter of a DVD, with reference to the size of each light receiving unit of the DVD light receiving area 22.

When the interval between: the main light receiving unit 22a; and the front sub-light receiving unit 22b and the rear sub-light receiving unit 22c of the DVD light receiving area 22 is 135 μm and the size of each light receiving unit if the DVD light receiving area 22 is 90 μm×90 μm, and the size of each light receiving unit of the CD light receiving area 21 is 73 μm×73 μm, and the interval d1 between: the main light receiving unit 21a; and the front sub-light receiving unit 21b and rear sub-light receiving unit 21c of the CD light receiving area 21 is 220 μm as above, as shown in FIG. 2, the front sub-light receiving unit 21b and the rear sub-light receiving unit 21c of the CD light receiving area 21 are formed at positions and in a size such that the unnecessary diffracted light beam spots Su1 and Su2 of the ±1st-order diffracted light beam are substantially avoided outwardly, wherein the ±1st-order diffracted light beam are generated when the first laser light beam for a CD passes through the second grating 4b supporting CDs.

Figure 7:
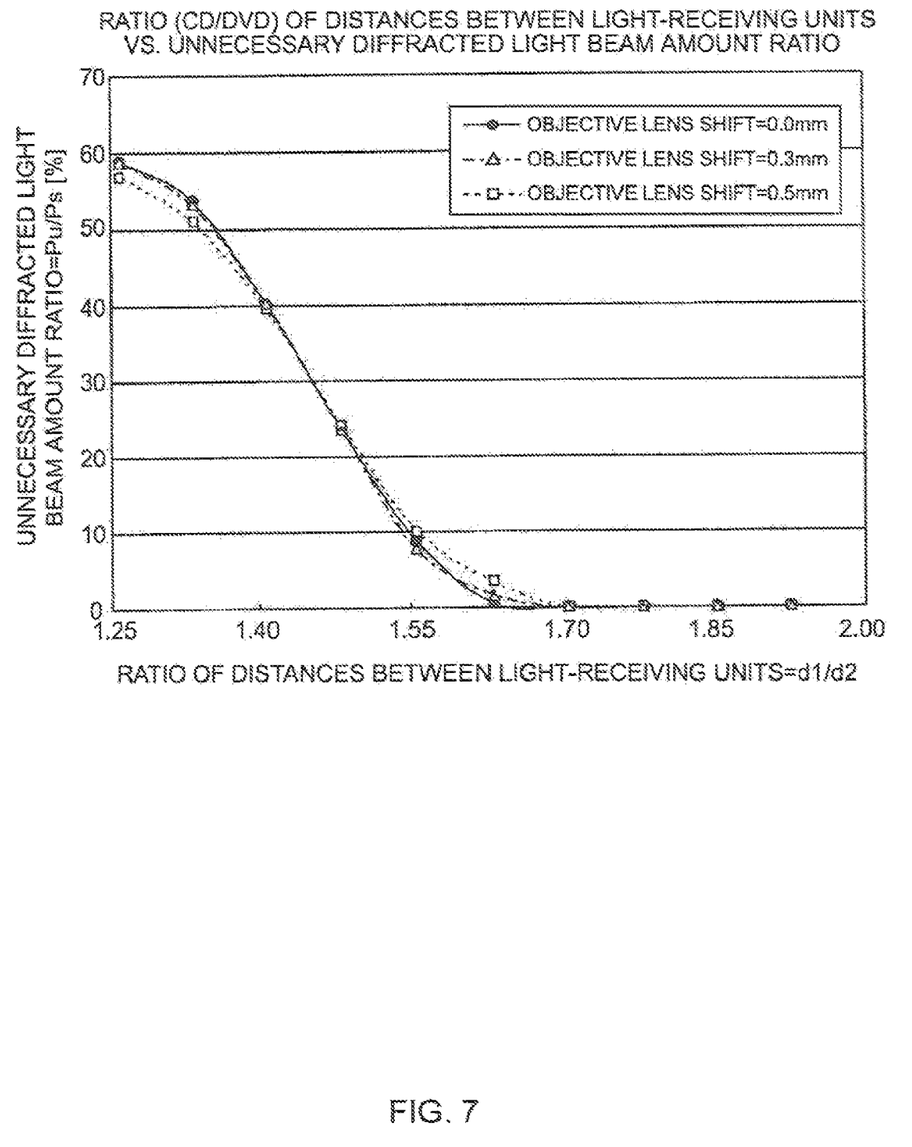
FIG. 7 is a graph of a ratio of unnecessary diffracted light beam amount, Pu/Ps, relative to a ratio of light receiving unit interval, d1/d2.

A graph is shown in FIG. 7 that represents on the X-axis a ratio of light receiving unit interval, d1/d2, that is the ratio of the interval d1 between: the main light receiving unit 21a; and the front sub-light receiving unit 21b and the rear sub-light receiving unit 21c of the CD light receiving area 21, relative to the interval d2 between: the main light receiving unit 22a; and the front sub-light receiving unit 22b and the rear sub-light receiving unit 22c of the DVD light receiving area 22, and that represents on the Y-axis a ratio of unnecessary diffracted light beam amount, Pu/Ps (%), that is the ratio of unnecessary diffracted light beam amount Pu of each of the unnecessary diffracted light beam spots Su1 and Su2, relative to a total Ps of the received light outputs from all the segment of the front sub-light receiving unit 21b and the rear sub-light receiving unit 21c of the CD light receiving area 21. In FIG. 7, simulation is executed assuming that the size of each light receiving unit of the DVD light receiving area 22 is 90 μm×90 μm and that the size of each light receiving unit of the CD light receiving area 21 is 73 μm×73 μm; black points indicate a state where the objective lens 10 is not shifted in the tracking direction; triangles indicate a state where the objective lens 10 is shifted by 0.3 mm in the tracking direction; and squares indicate a state where the objective lens 10 is shifted by 0.5 mm in the tracking direction. Because the orientation of the arrangement of the three beams on the photo detector is converted by 90 degree from that on the optical disc by the optical component in the return path, each of the unnecessary diffracted light beam spots Su1 and Su2 is displaced in the direction of the arrangement of the main light receiving unit 21a, the front sub-light receiving unit 21b, and the rear sub-light receiving unit 21c of the CD light receiving area 21 when the objective lens 10 is shifted in the tracking direction.

The displacement amount for shifting the objective lens 10 in the tracking direction during the actual tracking control, is set to be about 0.3 mm. Therefore, as shown in FIG. 7, variation of the ratio of unnecessary diffracted light beam amount, Pu/Ps, relative to the ratio of light receiving unit interval, d1/d2, obtained when the objective lens 10 is shifted in the tracking direction is almost not influenced. Because the ratio of unnecessary diffracted light beam amount, Pu/Ps, is equal to or less than 10%, when the ratio of light receiving unit interval, d1/d2, is equal to or larger then about 1.55, each of the unnecessary diffracted light beam spots Su1 and Su2 can be regarded as substantially avoidable the front sub-light receiving unit 21b and the rear sub-light receiving unit 21c of the CD light receiving area 21.

When each interval between the main spot, the front sub-spot, and the rear sub-spot of the three beams disposed on the optical disc is increased carelessly, the displacement of each spot in the radial direction of the optical disc becomes larger for the adjustment of the diffraction grating in the rotation direction for disposed each spot appropriately on the signal track, and the adjustment for disposing each spot becomes difficult. Therefore, the upper limit of the intervals between the main light receiving unit 21a, the front sub-light receiving unit 21b, and the rear sub-light receiving unit 21c of the CD light receiving area 21 is about 2.00 times as large as that of the DVD light receiving area 22.

Therefore, when each of the unnecessary diffracted light beam spots Su1 and Su2 can be regarded as substantially avoidable from the front sub-light receiving unit 21b and the rear sub-light receiving unit 21c of the CD light receiving area 21, the ratio of light receiving unit interval, d1/d2, that is the ratio of the interval d1 between: the main light receiving unit 21a; and the front sub-light receiving unit 21b and the rear sub-light receiving unit 21c of the CD light receiving area 21, relative to the interval d2 between: the main light receiving unit 22a; and the front sub-light receiving unit 22b and the rear sub-light receiving unit 22c of the DVD light receiving area 22 is preferably about 1.55 to 2.00.

In the case that the interval d2 between: the main light receiving unit 22a; and the front sub-light receiving unit 22b and the sub-light receiving unit 22c of the DVD light receiving area 22 is 135 μm, upon the ratio of unnecessary diffracted light beam amount, Pu/Ps, being about 10%, the interval d1 between: the main light receiving unit 21a; and the front sub-light receiving unit 21b and the rear sub-light receiving unit 21c of the CD light receiving area 21 is about 211 μm. In the same case as the above, upon the ratio of unnecessary diffracted light beam amount, Pu/Ps, being about 0%, the ratio of light receiving unit interval, d1/d2, is about 1.70, with the interval d1 being about 230 μm.

Not only the unnecessary diffracted light beam spots Su1 and Su2 of the ±1st diffracted light beams generated when the first laser light beam supporting CDs passes through the second grating 4b supporting DVDs, but also the unnecessary diffracted light beam spots Su3 and Su4 of ±1 st diffracted light beams generated when the second laser light beam supporting DVDs passes through the first grating 4a supporting CDs influence on the front sub-light receiving unit 22b and the rear sub-light receiving unit 22c of the DVD light receiving area 22, respectively.

When the interval d1 between: the main light receiving unit 21a; and the front sub-light receiving unit 21b and the rear sub-light receiving unit 21c of the CD light receiving area 21 is 220 μm, intervals d1' of: the unnecessary diffracted light beam spots Su3 and Su4 of the ±1st diffracted light beams generated when the second laser light beam for DVDs passes through the first grating 4a supporting CDs; form the center of the main light receiving unit 22a of the DVD light receiving area 22, is a value obtained by multiplying the interval d1 by the ratio of the wavelength 655 μm of the second laser light beam for DVDs relative to the wavelength 782 μm of the first laser light beam for CDs, 655/782, which is about 0.84, wherein the value is 220 μm×0.84, which is about 184 μm.

When the main light receiving unit 22a, the front sub-light receiving unit 22b, and the rear sub-light receiving unit 22c of the DVD light receiving area 22 are disposed with the intervals d2=135 μm respectively due to the setting of the second grating 4b of the diffraction grating 4, the interval d2 and the interval d1' have a difference, 184 μm−135 μm, which is 49 μm therebetween. In the above example, because the size of each light receiving unit of the DVD light receiving area 22 is 90 μm×90 μm, the unnecessary diffracted light beam spots Su3 and Su4 are disposed in the outer side of the front sub-light receiving unit 22b and the rear sub-light receiving unit 22c respectively, with the center of Su3 and Su4 being shifted by 49 μm−90 μm/2 which is 4 μm, from outer edge side of the front sub-light receiving unit 22b and the rear sub-light receiving unit 22c respectively. Therefore, the front sub-light receiving unit 22b and the rear sub-light receiving unit 22c of the DVD light receiving area 22 are disposed respectively at positions which avoid the centers of the unnecessary diffracted light beam sport Su3 and Su4 inwardly. However, a portion of each of the unnecessary diffracted light beam spots Su3 and Su4 overlaps the outer side of the front sub-light receiving unit 22b and the rear sub-light receiving unit 22c respectively, due to the size of the unnecessary diffracted light beam spots Su3 and Su4. Therefore, the interval d2 between the light receiving units of the DVD light receiving area 22 only needs to be made narrower than 135 μm, in order to suppress the degree of the influence of the unnecessary diffracted light beam spots Su3 and Su4 to the front sub-light receiving unit 22b and the rear sub-light receiving unit 22c. In this case, because the size of the light receiving units of the DVD light receiving area 22 is 90 μm×90 μm, the interval d2 between the light receiving units is set to be, e.g., 100

μm≦d2<135 μm, such that proper spacing is ensured between the light receiving units.

Figure 8:
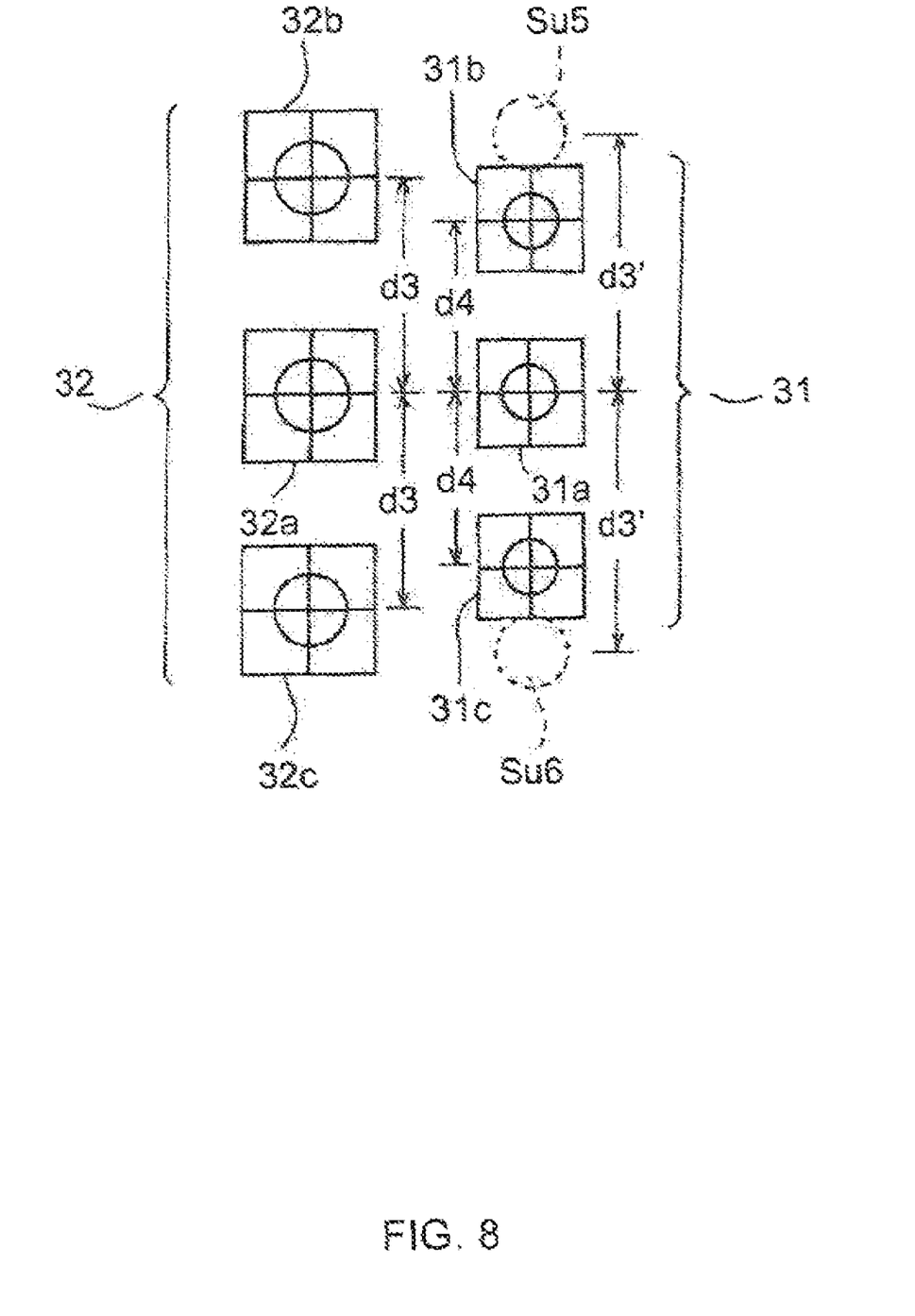
FIG. 8 is an explanatory view of another example different from that of FIG. 2 of an arrangement of light receiving units in the light receiving areas and of an arrangement of the light spots on the light receiving areas of the photo detector.

Another example different from that of FIG. 2 is shown in FIG. 8. In FIG. 8, when the size of each light receiving unit of a DVD light receiving area 32 is 90 μm×90 μm and the size of each light receiving unit of a CD light receiving area 31 is 73 μm×73 μm similarly to the above example of FIG. 2 and an interval d3 between: a main light receiving unit 32a; and a front sub-light receiving unit 32b and a rear sub-light receiving unit 32c of the DVD light receiving area 32 is made wider than that of the above example to be 150 μm, an interval d3' of: each of unnecessary diffracted light beam spots; from the center of the main light receiving unit 21a is 150 μm×782/665 (=1.19), which is about 179 μm. In this case, when an interval d4 between: a main light receiving unit 31a; and a front sub-light receiving unit 31b and a rear sub-light receiving unit 31c of the CD light receiving area 31 is 120 μand the first grating 4a of the diffraction grating 4 is set to match the interval d4 between the light receiving units, in view of the radius of each of the unnecessary diffracted light beam spots, as indicated by dotted lines of FIG. 8, the front sub-light receiving unit 31b and the rear sub-light receiving unit 31c of the CD light receiving area 31 are formed at positions and in size such that unnecessary diffracted light beam spots Su5 and Su6 are substantially avoided inwardly.

Note that although the above embodiment shows an example that uses the multi-laser unit 1 supporting two wavelengths, the apparatus may be configured to lead a plurality of laser light beams, each of which is different in wavelength from each other, to a common optical path in the outward path and to cause the laser light beams to pass through diffraction gratings which are disposed in the common path and which have diffracting action respectively on the laser light beams, or may be configured to include separate laser units that respectively emit the first laser light beam and the second laser light beam and to lead the laser light beams to the common optical path, or may be configured to use a multi-laser unit supporting three or more wavelengths.

Although the second grating 4b of the diffraction grating 4 is a phase shifting grating that generates a phase shift in each sub beam in the above embodiment, no disadvantage is arisen when a grating that has ordinary diffracting action and does not generate a same phase shift as that of the first grating 4a is used as the second grating 4b.

Although the embodiments of the present invention have been described, the above embodiments are for facilitating the understanding of the present invention and are not intended to limit the present invention in construing thereof. The present invention may be varied/modified without departing from the scope thereof and encompasses equivalents thereof.

What is claimed is:

1. An optical pickup apparatus comprising:
a diffraction grating including a first grating for diffracting a first laser light beam, and a second grating for diffracting a second laser light beam which is shorter in wavelength than the first laser light beam, the diffraction grating being disposed in a common optical path for guiding the first laser light beam and the second laser light beam to an optical disc; and
a photo detector including in a first light receiving area, a main light receiving unit, a front sub-light receiving unit, and a rear sub-light receiving unit that receive reflected light beams, which are reflected by the optical disc, of a main beam, of a front sub-beam, and of a rear sub-light, respectively, the first laser light beam being diffracted by the diffraction grating into the main beam, the front sub-beam formed in front of the main beam, and the rear sub-beam formed at the back of the main beam,
wherein the first grating is set such that the front sub-light receiving unit and the rear sub-light receiving unit in the first light receiving area are disposed at positions which substantially avoid unnecessary diffracted light beam spots which are generated by projecting unnecessary diffracted light beams to the first receiving area, the unnecessary diffracted light beams being generated by the second grating from the first laser light beam, and
wherein the photo detector includes in a second light receiving area, a main light receiving unit, a front sub-light receiving unit, and a rear sub-light receiving unit that receive reflected light beams, which are reflected by the optical disc, of a main beam, of a front sub-beam, and of a rear sub-beam, respectively, the second laser light beam being diffracted by the diffraction grating into the main beam, the front sub-beam formed in front of the main beam, and the rear sub-beam formed at the back of the main beam, and
wherein the front sub-light receiving unit and the rear sub-light receiving unit in the first light receiving area are disposed at positions which substantially avoid the unnecessary diffracted light beam spots,
on the basis of a ratio of a light receiving unit interval, d1/d2, that is a ratio of
an interval d1 between: the main light receiving unit; and the front sub-light receiving unit and the rear sub-light receiving unit in the first light receiving area, and
an interval d2 between: the main light receiving unit; and the front sub-light receiving unit and the rear sub-light receiving unit in the second light receiving area,
when a ratio of unnecessary diffracted light beam amount, Pu/Ps, is 10% or less, the ratio Pu/Ps being a ratio of a combined unnecessary diffracted light beam amount Pu of each unnecessary diffracted light beam spot, and a total of all received light output Ps in the front sub-light receiving unit and the rear sub-light receiving unit in the first light receiving area.

2. The optical pickup apparatus of claim 1, wherein the ratio of light receiving unit interval, d1/d2, is 1.55 or larger.

3. The optical pickup apparatus of claim 1, wherein the first laser light beam and the second laser light beam guided to an optical path on which the diffraction grating if disposed, are emitted from a multi-laser unit.

4. The optical pickup apparatus of claim 3,
wherein the photo detector includes in a second light receiving area, a main light receiving unit, a front sub-light receiving unit, and a rear sub-light receiving unit that receive reflected light beams, which are reflected by the optical disc, of a main beam, of a front sub-beam, and of a rear sub-beam, respectively, the second laser light beam being diffracted by the diffraction grating into the main beam, the front sub-beam in front of the main beam, and the rear sub-beam formed at the back of the main beam, and
wherein in the photo detector, the first light receiving area and the second light receiving area are disposed
in a direction perpendicular to a lining direction of the respective main light receiving units, the respective front sub-light receiving units, and the respective rear sub-light receiving units, depending on an interval between a first laser emitting point at which the multi-laser unit emits the first laser light beam and a second laser emitting point at which the multi-laser unit emits the second laser light beam.

5. The optical pickup apparatus of claim 1, wherein the photo detector includes in a second light receiving area, a main light receiving unit, a front sub-light receiving unit, and a rear sub-light receiving unit that receive reflected light beams, which are reflected by the optical disc, of a main beam, of a front sub-beam, and of a rear sub-beam, respectively, the second laser light beam being diffracted by the diffraction grating into the main beam, the front sub-beam formed in front of the main beam, and the rear sub-beam formed at the back of the main beam, and wherein the second grating is set such that the front sub-light receiving unit and the rear sub-light receiving unit in the second light receiving area are disposed at positions which substantially avoid unnecessary diffracted light beam spots which are generated by projecting to the second light receiving area unnecessary diffracted light beams, the unnecessary diffracted light beams being generated by the first grating from the second laser light beam.

6. An optical pickup apparatus comprising:

a diffraction grating including a first grating for diffracting a first laser light beam, and a second grating for diffracting a second laser light beam which is shorter in wavelength than the first laser light beam, the diffraction grating being disposed in a common optical path for guiding the first laser light beam and the second laser light beam to an optical disc; and a photo detector including in a first light receiving area, a main light receiving unit, a front sub-light receiving unit, and a rear sub-light receiving unit that receive reflected light beams, which are reflected by the optical disc, of a main beam, of a front sub-beam, and of a rear sub-light, respectively, the first laser light beam being diffracted by the diffraction grating into the main beam, the front sub-beam formed in front of the main beam, and the rear sub-beam formed at the back of the main beam, wherein the first grating is set such that the front sub-light receiving unit and the rear sub-light receiving unit in the first light receiving area are disposed at positions which substantially avoid unnecessary diffracted light beam spots which are generated by projecting unnecessary diffracted light beams to the first receiving area, the unnecessary diffracted light beams being generated by the second grating from the first laser light beam, and wherein area of the main light receiving unit, of the front sub-light receiving unit, and the rear sub-light receiving unit in the first light receiving area is smaller than area of the main light receiving unit, of the front sub-light receiving unit, and of the rear sub-light receiving unit in the second light receiving area.

7. The optical pickup apparatus of claim 6, wherein at least one of the first grating and the second grating of the diffraction grating is a phase shifting grating for diffracting such that a phase shift is generated thereby phase-inverting the front sub-beam and the rear sub-beam, and such that the front sub-beam and the rear sub-beam are applied on an identical signal track of the optical disc.

* * * * *

UNITED STATES PATENT AND TRADEMARK OFFICE
CERTIFICATE OF CORRECTION

PATENT NO. : 7,672,202 B2
APPLICATION NO. : 11/560758
DATED : March 2, 2010
INVENTOR(S) : Tohru Hotta It is certified that error appears in the above-identified patent and that said Letters Patent is hereby corrected as shown below:

Title page item (57), column 2 (the Abstract), line 21, after "beams" (second occurrence), insert -- being --.

Column 14, claim 4, line 9, after "sub-beam" insert -- formed --.

Signed and Sealed this

Twenty-ninth Day of June, 2010

David J. Kappos
*Director of the United States Patent and Trademark Office*